US012664464B2

(12) United States Patent
Kang et al.

(10) Patent No.: US 12,664,464 B2
(45) Date of Patent: Jun. 23, 2026

(54) METHOD AND APPARATUS FOR FEDERATED LEARNING OF ARTIFICIAL INTELLIGENCE MODEL USING NON-IID DATA

(71) Applicant: RESEARCH & BUSINESS FOUNDATION SUNGKYUNKWAN UNIVERSITY, Suwon-si (KR)

(72) Inventors: Seok Kyu Kang, Suwon-si (KR); Yong Hoon Kang, Suwon-si (KR); Jee Hyong Lee, Seoul (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 967 days.

(21) Appl. No.: 17/900,248

(22) Filed: Aug. 31, 2022

(65) Prior Publication Data

US 2023/0090731 A1     Mar. 23, 2023

(30) Foreign Application Priority Data

Sep. 8, 2021     (KR) ......................... 10-2021-0119944

(51) Int. Cl.
G06N 20/00 (2019.01)
G06F 21/62 (2013.01)

(52) U.S. Cl.
CPC ......... G06N 20/00 (2019.01); G06F 21/6245 (2013.01)

(58) Field of Classification Search
CPC ............................ G06N 20/00; G06F 21/6245
See application file for complete search history.

(56) References Cited

U.S. PATENT DOCUMENTS 12,367,349 B1 * 7/2025 Fathi ........................ G06F 40/40
2020/0050951 A1 * 2/2020 Wang ..................... G06N 20/00
(Continued)

FOREIGN PATENT DOCUMENTS

CN          113627540 A  * 11/2021  ......... G06F 18/2155

OTHER PUBLICATIONS

Gu et al., "Detecting Malicious Model Updates from Federated Learning on Conditional Variational Autoencoder," May 17-21, 2021, 2021 IEEE International Parallel and Distributed Processing Symposium (IPDPS), pp. 671-680, http://doi.org/10.1109/IPDPS49936.2021.00075, https://ieeexplore.ieee.org/document/9460523.*
(Continued)

*Primary Examiner* — Ryan Barrett

(57) ABSTRACT

The present disclosure relates to a method and an apparatus for federated learning of an artificial intelligence model. According to an exemplary embodiment of the present disclosure, a federated learning method of an artificial intelligence model includes: training a first local artificial intelligence model and a second local artificial intelligence model using data sets of a first client and a second client among the plurality of clients; calculating performance values for the first local artificial intelligence model and the second local artificial intelligence model by transmitting the first local artificial intelligence model to the second client and transmitting the second local artificial intelligence model to the first client; comparing the performance values to remove one of the first client and the second client; and training a global model using a client which is not removed.

6 Claims, 5 Drawing Sheets

(56) References Cited

U.S. PATENT DOCUMENTS

| | | | | |
|---|---|---|---|---|
| 2020/0285980 | A1* | 9/2020 | Sharad | G06N 3/098 |
| 2021/0073677 | A1* | 3/2021 | Peterson | G06N 3/09 |
| 2022/0158888 | A1* | 5/2022 | Lee | G06N 3/08 |
| 2022/0237523 | A1* | 7/2022 | Kwon | G06N 3/045 |
| 2022/0343219 | A1* | 10/2022 | Takasaki | G06N 20/00 |
| 2023/0177378 | A1* | 6/2023 | Hassan | G06N 20/00 |
| | | | | 706/12 |
| 2023/0186143 | A1* | 6/2023 | Chen | G06N 20/00 |
| | | | | 706/12 |
| 2023/0306310 | A1* | 9/2023 | Filippou | G06N 3/0985 |
| 2024/0070542 | A1* | 2/2024 | Lee | G06N 3/084 |
| 2024/0127109 | A1* | 4/2024 | Wang | G06N 20/00 |
| 2024/0249185 | A1* | 7/2024 | Gottin | G06N 20/00 |

OTHER PUBLICATIONS

Parsaeefard et al., "Robust Federated Learning by Mixture of Experts," Apr. 23, 2021, https://arxiv.org/abs/2104.11700.*

Zhang et al., "Edge Learning: The Enabling Technology for Distributed Big Data Analytics in the Edge," Jul. 18, 2021, ACM Computing Surveys (CSUR), vol. 54, Issue 7, Article 151, pp. 1-36, https://doi.org/10.1145/3464419, https://dl.acm.org/doi/10.1145/3464419.*

* cited by examiner

[FIG. 1]
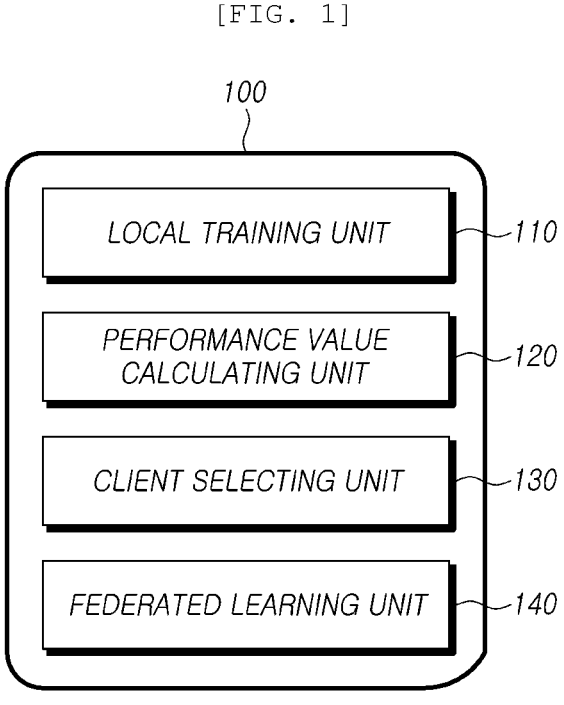

[FIG. 2]

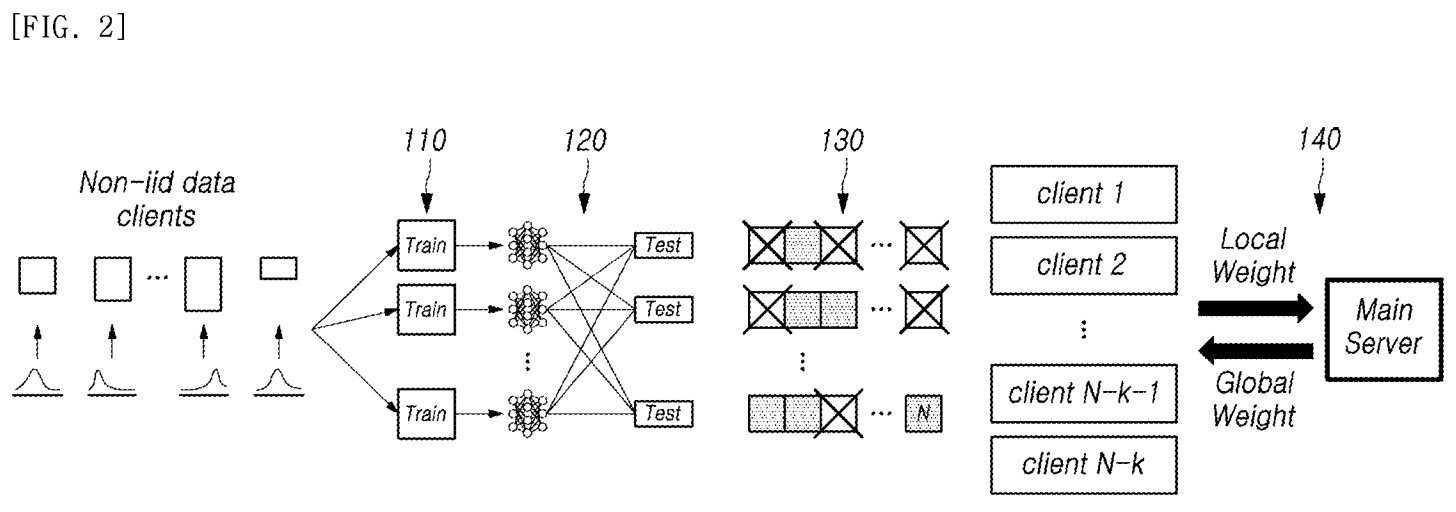

Non-iid data clients

110 Train

120

130

140

Main Server client 1 client 2

...

client N-k-1 client N-k

Local Weight

Global Weight

Test

N

[FIG. 3]
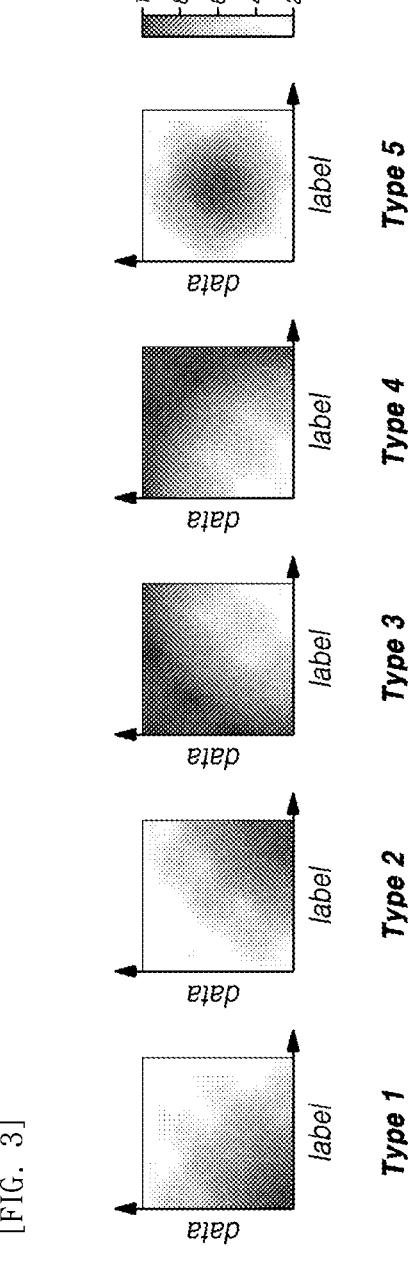

[FIG. 4]

| | Method | Non-IID | Type 1 | Type 2 | Type 3 | Type 4 | Type 5 |
|---|---|---|---|---|---|---|---|
| MNIST | FedAvg | Accuracy | 74.25% | 35.19% | 50.97% | 93.28% | 50.21% |
| | | Round | 21 | 32 | 37 | 26 | 20 |
| | CE-Fed | Accuracy | 99.04% | 91.52% | 89.92% | 99.36% | 99.20% |
| | | Round | 2 | 3 | 18 | 4 | 3 |
| Fashion MNIST | FedAvg | Accuracy | 74.12% | 45.20% | 46.42% | 78.24% | 43.15% |
| | | Round | 23 | 21 | 17 | 28 | 15 |
| | CE-Fed | Accuracy | 90.12% | 90.41% | 90.52% | 91.28% | 90.54% |
| | | Round | 3 | 2 | 2 | 5 | 3 |
| SVHN | FedAvg | Accuracy | 75.80% | 43.02% | 42.87% | 61.79% | 54.35% |
| | | Round | 28 | 41 | 39 | 29 | 30 |
| | CE-Fed | Accuracy | 90.54% | 80.90% | 87.35% | 34.32% | 88.65% |
| | | Round | 4 | 25 | 5 | 4 | 4 |
| CIFAR-10 | FedAvg | Accuracy | 44.70% | 35.78% | 38.18% | 55.49% | 36.18% |
| | | Round | 36 | 34 | 32 | 31 | 30 |
| | CE-Fed | Accuracy | 70.19% | 70.04% | 67.13% | 76.86% | 68.69% |
| | | Round | 14 | 7 | 13 | 10 | 9 |

[FIG. 5]
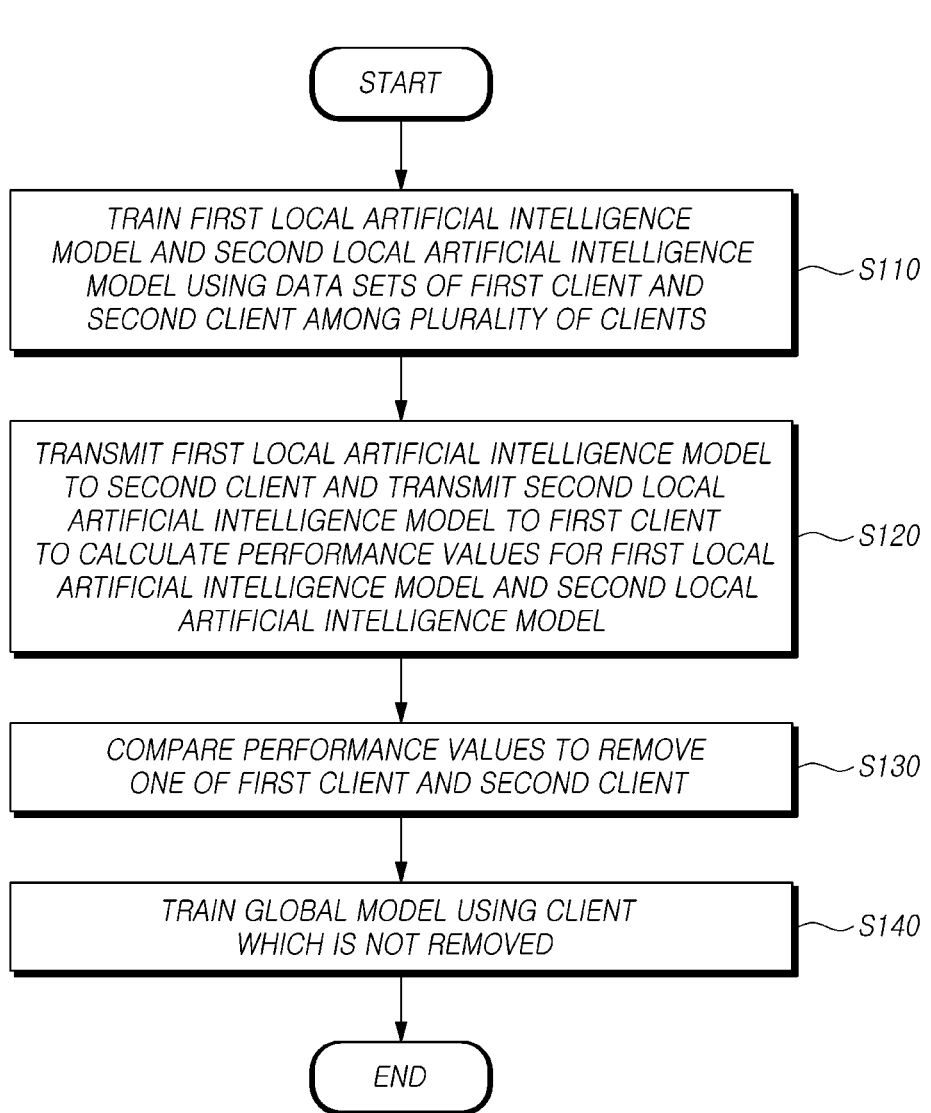

METHOD AND APPARATUS FOR FEDERATED LEARNING OF ARTIFICIAL INTELLIGENCE MODEL USING NON-IID DATA

CROSS REFERENCE TO RELATED APPLICATIONS

This application claims the benefit under 35 USC 119 (a) of Korean Patent Application No. 10-2021-0119944 filed on Sep. 8, 2021, in the Korean Intellectual Property Office, the entire disclosure of which is incorporated herein by reference for all purposes.

BACKGROUND

Field

The present disclosure relates to a method and an apparatus for federated learning of an artificial intelligence model, and more particularly, to a method and apparatus for federated learning of an artificial intelligence model using non-IID data.

Description of the Related Art

The federated learning is an artificial intelligence model learning methodology for protecting data privacy and according to the federated learning, a center server learns a global model using only parameters of a model trained in each local client without accessing data.

However, in the related art, the federated learning is performed by re-training the global model by repeatedly and collectively averaging parameters of the model trained in each local client.

Accordingly, there is a problem in that when a client having an extreme non-independent identically distributed (Non-IID) data having a very small amount of held data and labels of some local clients is used, the learning is not stably performed and the performance is significantly degraded.

Further, in order to remove some clients with such extreme Non-IID data, it is necessary to identify the data of the client, which causes a problem of invasion of data privacy.

Accordingly, a necessity for a technique of removing some clients without causing the invasion of data privacy is demanded.

SUMMARY

An object of the present disclosure is to provide a method and an apparatus of federated learning of an artificial intelligence model which are capable of removing some clients without causing the invasion of the data privacy by calculating a cross-performance value between clients.

Further, an object of the present disclosure is to provide a method and an apparatus of federated learning of an artificial intelligence model which train the global model to have a high image classification accuracy by removing some clients including extreme Non-IID data.

The object of the present disclosure is not limited to the above-mentioned objects and other objects and advantages of the present disclosure which have not been mentioned above can be understood by the following description and become more apparent from exemplary embodiments of the present disclosure. Further, it is understood that the objects and advantages of the present disclosure may be embodied by the means and a combination thereof in the claims.

According to an aspect of the present disclosure, a federated learning method of an artificial intelligence model includes: training a first local artificial intelligence model and a second local artificial intelligence model using data sets of a first client and a second client among the plurality of clients; calculating performance values for the first local artificial intelligence model and the second local artificial intelligence model by transmitting the first local artificial intelligence model to the second client and transmitting the second local artificial intelligence model to the first client; comparing the performance values to remove one of the first client and the second client; and training a global model using a client which is not removed.

Further, in an exemplary embodiment of the present disclosure, the training of a first local artificial intelligence model and a second local artificial intelligence model includes: training the first local artificial intelligence model and the second local artificial intelligence model by means of a local epoch and early stopping which exceed the predetermined reference number of times.

Further, in an exemplary embodiment of the present disclosure, in the calculating of performance values includes calculating a performance value of the first local artificial intelligence model using a data set of the second client and calculating a performance value of the second local artificial intelligence model using a data set of the first client.

Further, in an exemplary embodiment of the present disclosure, the removing includes: removing the second client when the following Equation 1 is satisfied as a comparison result of the performance value.

$$P_{1 \to 2} \geq P_{1 \to 1} > P_{2 \to 1} \qquad \text{<Equation 1>}$$

Here, $P_{1 \to 2}$ is a performance obtained by testing the first local artificial intelligence model with the data set of the second client, $P_{1 \to 1}$ is a performance obtained by training the first local artificial intelligence model with the data set of the first client, and $P_{2 \to 1}$ is a performance obtained by testing the second local artificial intelligence model with the data set of the first client.

Further, in an exemplary embodiment of the present disclosure, the data set is a non-independent identically distributed (Non-IID) data set.

Further, according to one aspect of the present disclosure, a federated learning apparatus of an artificial intelligence model includes: a local training unit which trains a first local artificial intelligence model and a second local artificial intelligence model using data sets of a first client and a second client among the plurality of clients; a performance value calculating unit which calculates performance values for the first local artificial intelligence model and the second local artificial intelligence model by transmitting the first local artificial intelligence model to the second client and transmitting the second local artificial intelligence model to the first client; a client selecting unit which compares the performance values to remove one of the first client and the second client; and a federated learning unit which trains a global model using a client which is not removed.

Further, in an exemplary embodiment of the present disclosure, the local training unit trains the first local artificial intelligence model and the second local artificial intelligence model by means of a local epoch and early stopping which exceed the predetermined reference number of times.

Further, in an exemplary embodiment of the present disclosure, the performance value calculating unit calculates a performance value of the first local artificial intelligence model using a data set of the second client and calculates a performance value of the second local artificial intelligence model using a data set of the first client.

Further, in an exemplary embodiment of the present disclosure, the client selecting unit removes the second client when the following Equation 1 is satisfied as a comparison result of the performance value.

$$P_{1 \to 2} \geq P_{1 \to 1} > P_{2 \to 1} \qquad \text{<Equation 1>}$$

Here, $P_{1 \to 2}$ is a performance obtained by testing the first local artificial intelligence model with the data set of the second client, $P_{1 \to 1}$ is a performance obtained by training the first local artificial intelligence model with the data set of the first client, and $P_{2 \to 1}$ is a performance obtained by testing the second local artificial intelligence model with the data set of the first client.

Further, in an exemplary embodiment of the present disclosure, the data set is a non-independent identically distributed (Non-IID) data set.

According to the exemplary embodiment of the present disclosure, the federated learning method and apparatus of an artificial intelligence model may remove some clients without causing the invasion of the data privacy by calculating a cross-performance value between clients.

Further, according to the exemplary embodiment of the present disclosure, the federated learning method and apparatus of an artificial intelligence model may train the global model to have a high image classification accuracy by removing some clients including extreme Non-IID data.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1 is a block diagram of a federated learning apparatus of an artificial intelligence model according to an exemplary embodiment of the present disclosure;

FIG. 2 is a diagram of a federated learning apparatus of an artificial intelligence model according to an exemplary embodiment of the present disclosure;

FIG. 3 is a view illustrating five types of Non-IID state setting according to an exemplary embodiment of the present disclosure;

FIG. 4 is a table obtained by comparing performances of a federated learning apparatus of an artificial intelligence model according to an exemplary embodiment of the present disclosure and another apparatus; and FIG. 5 is a flowchart of a federated learning method of an artificial intelligence model according to an exemplary embodiment of the present disclosure.

DETAILED DESCRIPTION OF THE EMBODIMENT

Those skilled in the art may make various modifications to the present disclosure and the present disclosure may have various embodiments thereof, and thus specific embodiments will be illustrated in the drawings and described in detail in detailed description. However, this does not limit the present disclosure within specific exemplary embodiments, and it should be understood that the present disclosure covers all the modifications, equivalents and replacements within the spirit and technical scope of the present disclosure. In the description of respective drawings, similar reference numerals designate similar elements.

Terms such as first, second, A, or B may be used to describe various components but the components are not limited by the above terms. The above terms are used only to distinguish one component from the other component. For example, without departing from the scope of the present disclosure, a first component may be referred to as a second component, and similarly, a second component may be referred to as a first component. A term of and/or includes combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is not present therebetween.

Terms used in the present application are used only to describe a specific exemplary embodiment, but are not intended to limit the present disclosure. A singular form may include a plural form if there is not clearly opposite meaning in the context. In the present disclosure, it should be understood that terminology "include" or "have" indicates that a feature, a number, a step, an operation, a component, a part or the combination thoseof described in the specification is present, but do not exclude a possibility of presence or addition of one or more other features, numbers, steps, operations, components, parts or combinations thoseof, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

Hereinafter, an exemplary embodiment of the present disclosure will be described in detail with reference to the accompanying drawings.

FIG. 1 is a block diagram of a federated learning apparatus of an artificial intelligence model according to an exemplary embodiment of the present disclosure and FIG. 2 is a diagram of a federated learning apparatus of an artificial intelligence model according to an exemplary embodiment of the present disclosure. This will be described with reference to FIGS. 1 and 2.

Referring to the drawings, the federated learning apparatus 100 of the artificial intelligence model trains a global model of a central server and a local intelligence model of a client. One central server interacts with a plurality of clients to receive a parameter of the local artificial intelligence model and the federated learning apparatus 100 of an artificial intelligence model trains the global model of the central server using the parameter of the local artificial intelligence model.

The federated learning apparatus 100 of an artificial intelligence model includes a local learning unit 110, a performance value calculating unit 120, a client selecting unit 130, and a federated learning unit 140.

The local learning unit 110 trains the local artificial intelligence model using data sets of the plurality of clients. Specifically, the local learning unit 110 trains a first local artificial intelligence model and a second local artificial intelligence model using data sets of a first client and a second client among the plurality of clients.

That is, the first local artificial intelligence model is trained by the data set of the first client and the second local artificial intelligence model is trained by the data set of the second client, independently.

Here, the first local artificial intelligence model and the second local artificial intelligence model may be different artificial intelligence models and the data set of the first client and the data set of the second client may be different types of data sets. At this time, the data set may be a non-independent identically distributed (Non-IID) data set in which each data of the client does not have independent and identical probability distribution.

Accordingly, the learning result may vary depending on the performance of the local artificial intelligence model and the data set held by the client.

At this time, the local learning unit 110 may train the first local artificial intelligence model and the second local artificial intelligence model by means of a local epoch which exceeds the predetermined reference number of times and early stopping.

Here, the local epoch refers to a period that all data included in the data set of each client participates in the learning of the local artificial intelligence model once and then updates a weight value. For example, when it is assumed that the data set includes 100 data, if all the first to 100-th data sets are input to the local artificial intelligence model, it is considered that training has been performed for one epoch.

Further, the predetermined reference number of times may be the number of times which is set in advance to appropriately train the first and second artificial intelligence models. For example, the reference number of times may be 10 times and the local learning unit 110 may train the first and second artificial intelligence models as many as the number of times which significantly exceeds the reference number of times (for example, 100 epochs). At this time, the first and second artificial intelligence models may be sufficiently trained to output a result value which is converged by the repeated learning.

In the meantime, when the artificial intelligence model is repeatedly trained by exceeding the reference number of times, the overfitting problem of outputting incorrect answers for an unlearned data may occur. Accordingly, the local learning unit 110 sets the early stopping to terminate the learning early before the overfitting problem occurs.

The performance value calculating unit 120 transmits the first local artificial intelligence model to the second client and transmits the second local artificial intelligence model to the first client to calculate performance values for the first local artificial intelligence model and the second local artificial intelligence model.

That is, the performance value calculating unit 120 calculates a performance value of the first local artificial intelligence model using the data set of the second client and calculates a performance value of the second local artificial intelligence model using the data set of the first client. The performance value of the local artificial intelligence model calculated here may refer to a classification accuracy (probability) for an image classification task.

As described above, the performance value calculating unit 120 cross-transmits the local artificial intelligence models to the clients to train not only the existing data set, but also a new data set of another environment and may calculate an objective and accurate performance value of each local artificial intelligence model.

The client selecting unit 130 compares the calculated performance values to remove one of the first client and the second client.

For example, when the following Equation 1 is satisfied as a result of comparing the performance values, the client selecting unit 130 removes the second client.

$$P_{1 \to 2} \geq P_{1 \to 1} > P_{2 \to 1} \qquad \text{<Equation 2>}$$

Here, $P_{1 \to 2}$ is a performance obtained by testing the first local artificial intelligence model with the data set of the second client, $P_{1 \to 1}$ is a performance obtained by training the first local artificial intelligence model with the data set of the first client, and $P_{2 \to 1}$ is a performance obtained by testing the second local artificial intelligence model with the data set of the first client.

That is, when $P_{1 \to 2}$ is equal to or higher than $P_{1 \to 1}$ and $P_{1 \to 1}$ is higher than $P_{2 \to 1}$, it means that the performance of the second local artificial intelligence model is significantly higher than the performance of the first local artificial intelligence model and the data set of the first client is highly likely to be extreme Non-IID data.

Accordingly, the client selecting unit 130 removes the second client of the second local artificial intelligence model having a worse performance and selects the first client so as to use only the first local artificial intelligence model to train the global model.

In contrast, when the following Equation 2 is satisfied as a result of comparing the performance values, the client selecting unit 130 removes the first client.

$$P_{2 \to 1} \geq P_{2 \to 2} > P_{1 \to 2} \qquad \text{<Equation 2>}$$

Here, $P_{2 \to 1}$ is a performance obtained by testing the second local artificial intelligence model with the data set of the first client, $P_{2 \to 2}$ is a performance obtained by training the second local artificial intelligence model with the data set of the second client, and $P_{1 \to 2}$ is a performance obtained by testing the first local artificial intelligence model with the data set of the second client.

As described above, the client selecting unit 130 may compare the calculated performance values to remove a client which interrupts the federated learning of the global model without directly accessing the data of the client in the central server.

Further, it is not necessary to know the entire data distribution of each client in advance so that when the federated learning is performed, data privacy may be ensured.

The federated learning unit 140 trains a global model using a client which is not removed.

That is, the federated learning unit 140 transmits a parameter of the artificial intelligence model of the selected client to the central server to train the global model. At this time, the federated learning unit 140 does not transmit a parameter corresponding to a local epoch which exceeds the reference number of times, but transmits a parameter corresponding to the local epoch of the reference number of times to the central server.

Here, the global model is an artificial intelligence model which is trained in the central server and has a VGG-9 based model structure. However, it is not necessarily limited thereto and the global model may include all the artificial intelligence models used for the federated learning.

FIG. 3 is a view illustrating five types of Non-IID state setting according to an exemplary embodiment of the present disclosure and FIG. 4 is a table obtained by comparing performances of a federated learning apparatus of an artificial intelligence model according to an exemplary embodiment of the present disclosure and another apparatus. This will be described with reference to FIGS. 3 and 4.

Referring to FIG. 3, the larger the number of distributed clients, the darker the state represented, the smaller the number of distributed clients, the lighter the state represented. Each type has a different client distribution and as the clients are distributed in the upper right, data sets (Non-IID data which is not extreme) have enough data and labels and as the clients are distributed in the lower left, the data sets (extreme non-IID data) have very small data and labels.

In the case of type 1, many clients are distributed in the lower left so that there is a plurality of extreme Non-IID data and in the case of type 4, many clients are distributed in the upper right so that there is a small number of extreme Non-IID data.

Referring to FIG. 4, a comparison result of an accuracy of an image classification task and communication rounds of the federated learning apparatus (CE-Fed) of the artificial intelligence model and the existing federated learning apparatus (FedAvg) for the data sets MNIST, Fashion MNIST, SVHN, CIFAR-10 may be confirmed.

As illustrated in FIG. 4, in the federated learning apparatus of the artificial intelligence model of the present disclosure, the accuracy for all types is improved by approximately 31.93% on average compared to the federated learning apparatus of the related art and the communication rounds are shortened by 22 or more on average.

FIG. 5 is a flowchart of a federated learning method of an artificial intelligence model according to an exemplary embodiment of the present disclosure.

Referring to the drawing, in step S110, the federated learning apparatus of the artificial intelligence model trains a first local artificial intelligence model and a second local artificial intelligence model using data sets of a first client and a second client among the plurality of clients.

Further, in step S120, the federated learning apparatus of the artificial intelligence model transmits the first local artificial intelligence model to the second client and transmits the second local artificial intelligence model to the first client to calculate performance values for the first local artificial intelligence model and the second local artificial intelligence model.

Further, in step S130, the federated learning apparatus of the artificial intelligence model compares the performance values to remove one of the first client and the second client and finally, in step S140, the federated learning apparatus of the artificial intelligence model trains the global model using a client which is not removed.

As described above, although the present disclosure has been described with reference to the exemplary drawings, it is obvious that the present disclosure is not limited by the exemplary embodiment and the drawings disclosed in the present disclosure and various modifications may be performed by those skilled in the art within the range of the technical spirit of the present disclosure. Further, although the effects of the configuration of the present disclosure have not been explicitly described while describing the embodiments of the present disclosure, it is natural that the effects predictable by the configuration should also be recognized.

What is claimed is:

1. A federated learning method of an artificial intelligence model, comprising:

training a first local artificial intelligence model and a second local artificial intelligence model using data sets of a first client and a second client among the plurality of clients;

calculating performance values for the first local artificial intelligence model and the second local artificial intelligence model by transmitting the first local artificial intelligence model to the second client and transmitting the second local artificial intelligence model to the first client, wherein a data set of the second local intelligence model is a non-independent identically distributed (Non-IID) data set having a small volume and a plurality of labels local to the second client;

comparing the performance values to remove the second client; and training a VGG-9 global model in an image classification task using the first client which is not removed, wherein the training of a first local artificial intelligence model and a second local artificial intelligence model includes:

training the first local artificial intelligence model and the second local artificial intelligence model by a local epoch which exceeds a predetermined reference number of times.

2. The federated learning method of an artificial intelligence model according to claim 1, wherein the calculating of performance values includes:

calculating a performance value of the first local artificial intelligence model using a data set of the second client and calculating a performance value of the second local artificial intelligence model using a data set of the first client.

3. The federated learning method of an artificial intelligence model according to claim 1, wherein the removing includes:

removing the second client when the following Equation 1 is satisfied as a comparison result of the performance value:

$$P1{\rightarrow}2{\geq}P1{\rightarrow}1{>}P2{\rightarrow}1 \qquad \text{<Equation 1>}$$

here, $P1{\rightarrow}2$ is a performance obtained by testing the first local artificial intelligence model with the data set of the second client, $P1{\rightarrow}1$ is a performance obtained by training the first local artificial intelligence model with the data set of the first client, and $P2{\rightarrow}1$ is a performance obtained by testing the second local artificial intelligence model with the data set of the first client.

4. A federated learning apparatus of an artificial intelligence model, comprising:

one or more processors which execute an instruction, wherein the one or more processors perform:

training a first local artificial intelligence model and a second local artificial intelligence model using data sets of a first client and a second client among the plurality of clients, by a local learning unit;

calculating performance values for the first local artificial intelligence model and the second local artificial intelligence model by transmitting the first local artificial intelligence model to the second client and transmitting the second local artificial intelligence model to the first client, by a performance value calculating unit, wherein a data set of the second local intelligence model is a non-independent identically distributed (Non-IID) data set having a small volume and a plurality of labels local to the second client;

comparing the performance values to remove the second client, by a client selecting unit; and training a VGG-9 global model in an image classification task using the first client which is not removed, by a federated learning unit, wherein the local learning unit trains the first local artificial intelligence model and the second local artificial intelligence model by a local epoch which exceeds a predetermined reference number of times.

5. The federated learning apparatus of an artificial intelligence model according to claim 4, wherein the performance value calculating unit calculates a performance value of the first local artificial intelligence model using a data set of the second client and calculates a performance value of the second local artificial intelligence model using a data set of the first client.

6. The federated learning apparatus of an artificial intelligence model according to claim 4, wherein the client selecting unit removes the second client when the following Equation 1 is satisfied as a comparison result of the performance value:

$$P1{\rightarrow}2 \geq P1{\rightarrow}1 > P2{\rightarrow}1 \qquad \text{<Equation 1>}$$

here, $P1{\rightarrow}2$ is a performance obtained by testing the first local artificial intelligence model with the data set of the second client, $P1{\rightarrow}1$ is a performance obtained by training the first local artificial intelligence model with the data set of the first client, and $P2{\rightarrow}1$ is a performance obtained by testing the second local artificial intelligence model with the data set of the first client.

\* \* \* \* \*